United States Patent
Wu

(10) Patent No.: US 11,633,820 B2
(45) Date of Patent: Apr. 25, 2023

(54) FIXING JIG

(71) Applicant: Fulian Precision Electronics (Tianjin) Co., LTD., Tianjin (CN)

(72) Inventor: Chia-Hsiu Wu, New Taipei (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 67 days.

(21) Appl. No.: 17/239,990

(22) Filed: Apr. 26, 2021

(65) Prior Publication Data
US 2022/0241914 A1    Aug. 4, 2022

(30) Foreign Application Priority Data
Jan. 29, 2021  (CN) .......................... 202110128385.X

(51) Int. Cl.
*B23Q 3/06* (2006.01)
*B25B 1/10* (2006.01)

(52) U.S. Cl.
CPC .................. *B23Q 3/06* (2013.01); *B25B 1/10* (2013.01); *B25B 1/103* (2013.01); *B23Q 2703/02* (2013.01)

(58) Field of Classification Search
CPC .. B25B 1/10; B25B 1/103; B25B 1/20; B25B 1/2405; B25B 1/2473; B25B 11/00; B23Q 3/06; B23Q 2703/02; G01M 7/02
USPC ...................................................... 269/41, 134
See application file for complete search history.

(56) References Cited

U.S. PATENT DOCUMENTS 4,092,205 A * 5/1978 Mieszczak ........ B29C 66/73921
                                                100/293
5,141,213 A * 8/1992 Chern ................... B25B 1/2452
                                                269/282

FOREIGN PATENT DOCUMENTS

| CN | 207502143 | 6/2018 |
| CN | 211978256 | 11/2020 |
| TW | M372465 | 1/2010 |

* cited by examiner

*Primary Examiner* — Mahdi H Nejad
(74) *Attorney, Agent, or Firm* — ScienBiziP, P.C.

(57) ABSTRACT

A fixing jig includes a support plate for supporting a workpiece. A fixing member is arranged on the support plate and defines a receiving groove penetrating a bottom surface of the fixing member. A stopper is slidably received in the receiving groove. A bottom surface of the stopper is flush with the bottom surface of the fixing member and contacts the support plate. An end of the stopper extends out of the receiving groove and abuts against the workpiece. The adjusting member is coupled to the fixing member. One end of the adjusting member extends into the receiving groove and is coupled to the stopper. The adjusting member is used to adjust a position of the stopper. The locking member is arranged on the adjusting member and used to lock a position of the adjusting member, thereby locking the position of the stopper.

12 Claims, 2 Drawing Sheets

FIXING JIG

FIELD

The subject matter herein generally relates to a fixing jig for positioning a workpiece.

BACKGROUND

In a vibration test of a workpiece of a computer server, a stopper is usually used to fix a displacement of the workpiece in a horizontal direction. However, gaps may exist between the stopper and the workpiece, which will reduce the accuracy of vibration testing.

BRIEF DESCRIPTION OF THE DRAWINGS

Implementations of the present disclosure will now be described, by way of embodiments, with reference to the attached figures.

DETAILED DESCRIPTION

Figure 1:
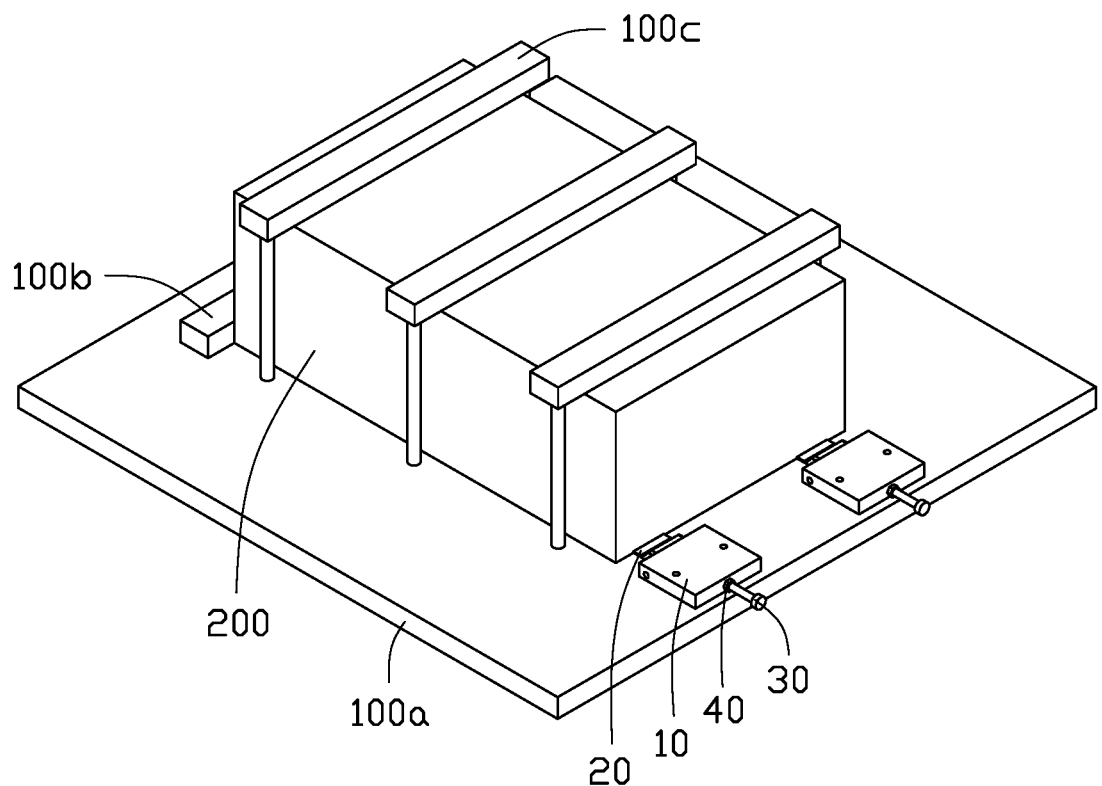
FIG. 1 is a perspective schematic diagram of a fixing jig according to an embodiment of the present disclosure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or another word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

Figure 2:
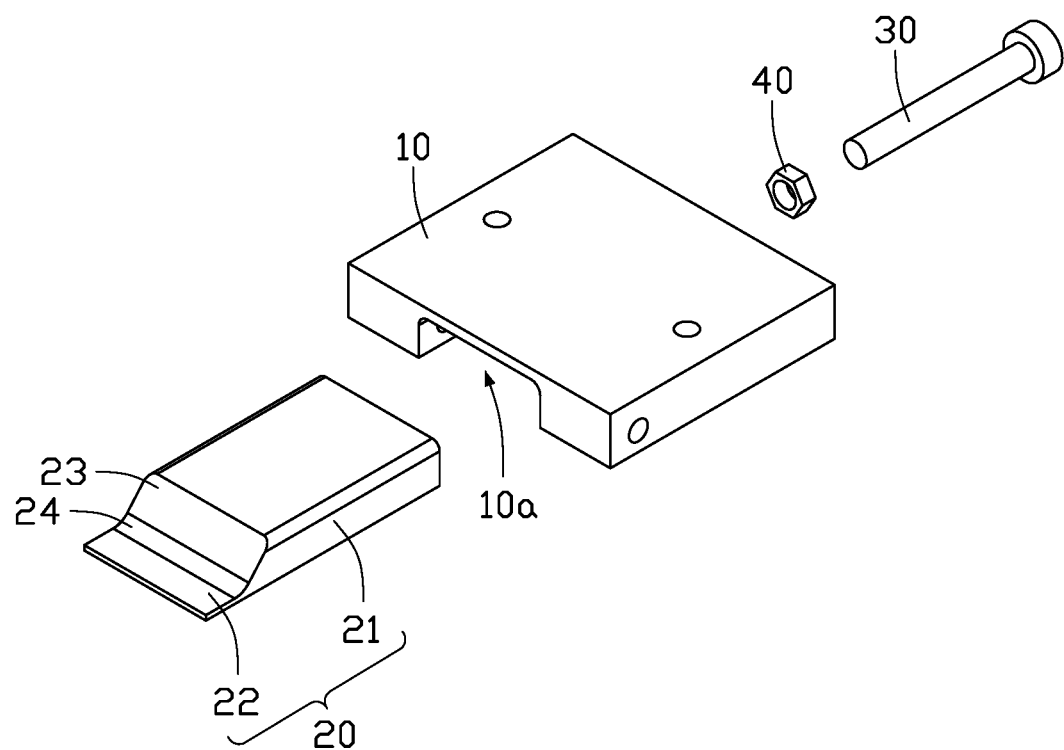
FIG. 2 is an exploded view of a fixing member, a stopper, an adjusting member, and a locking member of FIG. 1.

FIG. 1 and FIG. 2, show an embodiment of a fixing jig 100 for positioning a workpiece 200 in a horizontal direction. The fixing jig 100 includes a support plate 100a, a fixing member 10, a stopper 20, an adjusting member 30 and a locking member 40. The support plate 100a is arranged horizontally, and a top of the support plate 100 is used to support the workpiece 200. The fixing member 10 is fixedly arranged on the support plate 100a. The fixing member 10 defines a receiving groove 10a. The stopper 20 is slidably received in the receiving groove 10a. A side wall of one end of the stopper 20 protruding from the receiving groove 10a is used to abut against the workpiece 200 to position the workpiece 200 in the horizontal direction. The adjusting member 30 is coupled to the fixing member 10. One end of the adjusting member 30 extends into the receiving groove 10a and is coupled to the stopper 20, and another end of the adjusting member 30 is located outside the receiving groove 10a. The adjusting member 30 is used to adjust the position of the stopper 20. The locking member 40 is arranged on the adjusting member 30 and used to lock the position of the adjusting member 30 and further lock the position of the stopper 20. In one embodiment, the adjusting member 30 is a screw, and the locking member 40 is a nut. The adjusting member 30 is coupled to the fixing member 10 through a thread, and the locking member 40 is sleeved on the adjusting member 30 and arranged outside the receiving groove 10a. The end of the member 30 is rotationally coupled to the stopper 20. When the adjusting member 30 is rotated, the adjusting member 30 will move relative to the fixing member 10, and then drive the stopper 20 to move. The locking member 40 is rotated to lock the position of the adjusting member 30 and the position of the stopper 20. As an illustrative example, the workpiece 200 is a computer chassis.

The receiving groove 10a penetrates a bottom surface of the fixing member 10, and a bottom surface of the stopper 20 is flush with the bottom surface of the fixing member 10 and contacts the top surface of the support plate 100a, so that the stopper 20 is always located on the support plate 100a. Thus, the stopper 20 is prevented from shaking or excessively deforming.

In order to reduce a contact area with the workpiece 200, the stopper 20 includes a main body 21 and a pushing portion 22. The main body 21 is slidably received in the receiving groove 10a. The pushing portion 22 is coupled to one end of the main body 21 protruding from the receiving groove 10a. A length of the main body 21 is greater than a length of the pushing portion 22. A width of the main body 21 is the same as a width of the pushing portion 22. A cross-sectional area of the pushing portion 22 is smaller than a cross-sectional area of the main body 21. In one embodiment, both the main body 21 and the pushing portion 22 are substantially a rectangular parallelepiped, and a height of the pushing portion 22 is less than a height of the main body 21.

In order to reduce internal stress and deformation of the stopper 20, the bottom surface of the pushing portion 22 is flush with the bottom surface of the main body 21, so that the stopper 20 as a whole adheres to the support plate 100a, and a top surface of the pushing portion 22 is coupled to a top surface of the main body 21 through an inclined surface 23 to prevent excessive stress at a connection between the pushing portion 22 and the main body 21, which improves a bonding strength between the pushing portion 22 and the main body 21 and prevents the pushing portion 22 from breaking off the main body 21.

In order to further reduce the internal stress and deformation of the stopper 20, a rounded edge 24 is arranged between the inclined surface 23 and the top surface of the pushing portion 22. The rounded edge 24 is used to improve the bonding strength between the pushing portion 22 and the main body 21 to prevent the pushing portion 22 from breaking off the main body 21 when the workpiece 200 is pushed.

The cross-sectional shape of the main body 21 is the same as the cross-sectional shape of the receiving groove 10a.

Thus, a side of the receiving groove 10a slidably contacts an outer side of the stopper 20, thereby preventing the stopper 20 from rotating in the sliding groove 10a.

In one embodiment, the adjusting member 30 can adjust a distance that the stopper 20 extends from the receiving slot 10a within a range of 4-5.5 cm.

As shown in FIG. 1, the fixing jig 100 further includes a plurality of beams 100c. Each beam 100c is arranged above the bearing plate 100a. The beams 100c are used to compress the workpiece 200 in a vertical direction on the support plate 100a. In one embodiment, a screw penetrates two ends of each beam 100c. One end of the screw is coupled to the bearing plate 100a, and a nut is sleeved on another end of the screw. The nut is used to fix a height of the beam 100c to fix the workpiece 200 in the vertical direction.

In summary, the workpiece 200 is placed on the support plate 100a. The adjusting member 30 is rotated so that the stopper 20 abuts the workpiece 200 until the workpiece 200 is fixed in the horizontal direction. When the workpiece 200 is adjusted, the locking member 40 is rotated to lock the position of the stopper 20, thereby locking the position of the workpiece 200 in the horizontal direction. Then, the height of the beams 100c is adjusted to press the workpiece 200 onto the support plate 100a, thereby stabilizing the position of the workpiece 200 in the vertical direction.

As shown in FIG. 1, a limiting block 100b may be arranged on the support plate 100a, and the stopper 20 is arranged opposite to the limiting block 100b. The stopper 20 pushes the workpiece 200 to abut a side of the limiting block 100b, thereby fixing the position of the workpiece 200.

A vibration testing machine (not shown in the figures) may include a vibrator and the fixing jig 100. The fixing jig 100 is used to position the workpiece, and the vibrator is used to vibrate the fixing jig 100 to drive the workpiece to vibrate.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A fixing jig comprising:
   a support plate configured for supporting a workpiece;
   a fixing member arranged on the support plate, the fixing member defining a receiving groove penetrating a bottom surface of the fixing member;
   a stopper slidably received in the receiving groove, a bottom surface of the stopper being flush with the bottom surface of the fixing member and contacting the support plate, an end of the stopper extending out of the receiving groove to abut against the workpiece thereby positioning the workpiece in a horizontal direction;
   an adjusting member coupled to the fixing member, one end of the adjusting member extending into the receiving groove and coupled to the stopper, and another end of the adjusting member arranged outside the receiving groove, the adjusting member being configured to adjust a position of the stopper; and
   a locking member arranged on the adjusting member and configured to lock a position of the adjusting member, thereby locking the position of the stopper; wherein:
   a cross-sectional area of the end of the stopper extending out of the receiving groove is less than a cross-sectional area of the end of the stopper received in the receiving groove;
   the stopper comprises a main body and a pushing portion;
   the main body is slidably received in the receiving groove, and the pushing portion is coupled to an end of the main body;
   the pushing portion protrudes from the receiving groove;
   a length of the main body is greater than a length of the pushing portion;
   a width of the main body is the same as a width of the pushing portion; and
   a cross-sectional area of the pushing portion is less than a cross-sectional area of the main body.

2. The fixing jig of claim 1, wherein:
   a bottom surface of the pushing portion is flush with a bottom surface of the main body; and
   a top surface of the pushing portion is coupled to a top surface of the main body through an inclined surface.

3. The fixing jig of claim 2, wherein:
   a rounded edge is arranged between the inclined surface and the top surface of the pushing portion.

4. The fixing jig of claim 1, wherein:
   the cross-sectional shape of the main body is the same as a cross-sectional shape of the receiving groove.

5. The fixing jig of claim 1, wherein:
   a distance that the stopper extends from the receiving slot is within a range of 4-5.5 cm.

6. The fixing jig of claim 1, further comprises a plurality of beams, wherein:
   each of the plurality of beams is located above the support plate;
   two ends of each beam are coupled to the support plate; and
   the plurality of beams is configured to press the workpiece onto the support plate in a vertical direction.

7. A fixing jig comprising:
   a support plate used for supporting a workpiece;
   a fixing member arranged on the support plate, the fixing member defining a receiving groove penetrating a bottom surface of the fixing member;
   a stopper slidably received in the receiving groove, a bottom surface of the stopper being flush with the bottom surface of the fixing member and contacting the support plate, an end of the stopper extending out of the receiving groove and being configured to abut against the workpiece;
   an adjusting member coupled to the fixing member, one end of the adjusting member extending into the receiving groove and coupled to the stopper, and another end of the adjusting member arranged outside the receiving groove, the adjusting member being configured to adjust a position of the stopper;
   a locking member arranged on the adjusting member and being configured to lock a position of the adjusting member, thereby locking the position of the stopper; and
   a limiting block arranged on the support plate, the stopper arranged opposite to the limiting block, and the stopper and the limiting block cooperatively fixing the position of the workpiece in the horizontal direction;
   the stopper comprises a main body and a pushing portion;
   the main body is slidably received in the receiving groove, and the pushing portion is coupled to an end of the main body;
   the pushing portion protrudes from the receiving groove;

a length of the main body is greater than a length of the pushing portion;

a width of the main body is the same as a width of the pushing portion; and a cross-sectional area of the pushing portion is less than a cross-sectional area of the main body.

8. The fixing jig of claim 7, wherein:

a bottom surface of the pushing portion is flush with a bottom surface of the main body; and a top surface of the pushing portion is coupled to a top surface of the main body through an inclined surface.

9. The fixing jig of claim 8, wherein:

a rounded edge is arranged between the inclined surface and the top surface of the pushing portion.

10. The fixing jig of claim 9, wherein:

the cross-sectional shape of the main body is the same as a cross-sectional shape of the receiving groove.

11. The fixing jig of claim 10, wherein:

a distance that the stopper extends from the receiving slot is within a range of 4-5.5 cm.

12. The fixing jig of claim 11, further comprises a plurality of beams, wherein:

each of the plurality of beams is located above the support plate;

two ends of each beam are coupled to the support plate; and the plurality of beams is configured to press the workpiece onto the support plate in a vertical direction.

* * * * *